United States Patent
Zhou et al.

(10) Patent No.: US 11,316,764 B1
(45) Date of Patent: Apr. 26, 2022

(54) DETECTING NETWORK ANOMALIES FOR ROBUST SEGMENTS OF NETWORK INFRASTRUCTURE ITEMS IN ACCORDANCE WITH SEGMENT FILTERS ASSOCIATED VIA FREQUENT ITEMSET MINING

(71) Applicant: AT&T Intellectual Property I, L.P., Atlanta, GA (US)

(72) Inventors: Zhengyi Zhou, Chappaqua, NY (US); Deirdre Paul, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/210,109

(22) Filed: Mar. 23, 2021

(51) Int. Cl.
*G06F 15/173* (2006.01)
*H04L 43/08* (2022.01)
*H04L 41/0893* (2022.01)
*H04L 41/142* (2022.01)
*H04L 41/0816* (2022.01)

(52) U.S. Cl.
CPC .......... *H04L 43/08* (2013.01); *H04L 41/0816* (2013.01); *H04L 41/0893* (2013.01); *H04L 41/142* (2013.01)

(58) Field of Classification Search
CPC . H04L 43/08; H04L 41/0816; H04L 41/0893; H04L 41/142
See application file for complete search history.

(56) References Cited

PUBLICATIONS

John Matson, "Introducing anomaly detection in Datadog," Oct. 27, 2016, https://www.datadoghq.com/blog/introducing-anomaly-detection-datadog/.
Andont Autonomous Detection, Find and fix key business incidents as they're happening, https://www.anodot.com/autonomous-detection/.
Dasu, T et al, "FIT to monitor feed quality", VLDB 8 2015, http://www.vldb.org/pvldb/vol8/p1728-dasu.pdf.
Agrawal, R.; Imielinski, T.; Swami, A. "Mining association rules between sets of items in large databases". Proceedings of the 1993 ACM SIGMOD international conference on Management of data.

*Primary Examiner* — Wing F Chan
*Assistant Examiner* — Joseph R Miniwang (57) ABSTRACT

A processing system may generate segments of network infrastructure items deployed in a communication network, each segment comprising network infrastructure items grouped in accordance with segment filters and a segment size sparsity threshold, and identify anomalous segments comprising at least a subset of the segments having anomalies of an anomaly type regarding a performance indicator. The processing system may next determine segments from the subset that are defined by sets of segment filter values that are different for less than a threshold number of segment filters, merge the segments from the subset that are different for less than the threshold number to create at least one aggregate segment, and generate a ranking of the subset having the anomalies of the anomaly type, wherein the ranking includes the at least one aggregate segment. The processing system may then perform at least one action in the communication network responsive to the ranking.

20 Claims, 3 Drawing Sheets

DETECTING NETWORK ANOMALIES FOR ROBUST SEGMENTS OF NETWORK INFRASTRUCTURE ITEMS IN ACCORDANCE WITH SEGMENT FILTERS ASSOCIATED VIA FREQUENT ITEMSET MINING

The present disclosure relates generally to communication network monitoring and configuration, and more particularly to methods, non-transitory computer-readable media, and apparatuses for detecting network anomalies for robust segments of network infrastructure items in accordance with segment filters associated via frequent itemset mining.

BACKGROUND

There are a huge number of network infrastructure elements/items within a telecommunication network, such as routers, gateways, etc. Large amounts of data may be collected with respect to the performance of these network elements, such as packet loss rate, device temperature, link failure rate, etc., which can be a challenge to manage and derive insights from.

SUMMARY

In one example, the present disclosure describes a method, computer-readable medium, and apparatus for detecting network anomalies for robust segments of network infrastructure items in accordance with segment filters associated via frequent itemset mining. For instance, a processing system including at least one processor may generate a plurality of segments of network infrastructure items deployed in a communication network, each segment of the plurality of segments comprising a set of one or more of the network infrastructure items that are grouped in accordance with a plurality of segment filters and a segment size sparsity threshold. The processing system may then identify anomalous segments comprising at least a subset of the plurality of segments having anomalies of an anomaly type regarding a performance indicator. The processing system may next determine segments from the subset of the plurality of segments that are defined by sets of segment filter values that are different for less than a threshold number of segment filters, merge the segments from the subset of the plurality of segments that are defined by the sets of segment filters values that are different for less than the threshold number of segment filters to create at least one aggregate segment, and generate a ranking of the subset of the plurality of segments having the anomalies of the anomaly type, wherein the ranking includes the at least one aggregate segment. The processing system may then perform at least one action in the communication network responsive to the ranking.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Examples of the present disclosure describe methods, computer-readable media, and apparatuses for detecting network anomalies for robust segments of network infrastructure items in accordance with segment filters associated via frequent itemset mining. In particular, examples of the present disclosure identify robust segments of network infrastructure items of a communication network having key performance indicators (KPIs) that are abnormal when compared to either a respective segment's own history or to peer segments within a defined population. Existing network anomaly detection methods may concentrate on tracking a quantity, e.g. KPIs, over time. Examples of the present disclosure also broaden the scope to detect segments having KPIs that are abnormal when compared to peer segments in any defined population. In particular, examples of the present disclosure may systematically and thoroughly search for the most significant segments driving a network anomaly which may escape notice at higher aggregations, and which may be hard to manually trace. In one example, the present disclosure may also identify commonalities among top abnormal segments with respect to a KPI. The present disclosure may also guard against biased or invalid anomaly conclusions resulting from small segments or large outliers, which existing solutions are prone to produce.

In one example, the present disclosure applies frequent itemset mining and association rule mining to intelligently and optimally combine small segments of network infrastructure items to form robust segments large enough for statistically robust conclusions without diluting anomaly signals. It should be noted that as referred to herein, the term "robust" is used in the statistical sense, meaning that outputs and conclusions are invariant to small changes in input variable distributions. In one example, the present disclosure is customizable, providing options to define segments, populations of segments, and types of comparisons desired (over time and/or against peer segments). The outputs may produce immediate quantification of each segment's contribution toward a network anomaly, and are interpretable and ranked for clear, actionable, and prioritized network operational action(s).

Examples of the present disclosure quickly find groups or segments of network infrastructure items (such as routers, gateways, optical networking terminals (ONTs), firewalls, MFN (mini-fiber nodes), fiber-optic cables, optical switches, databases, line cards, antennas, baseband units, cable headends, video on demand (VoD) servers, batteries, generators, etc.) having abnormal KPIs, either compared to a segment's own history or to some defined population of network infrastructure items. In particular, the present examples find robust segments, e.g., segments with enough data for valid conclusions while not being skewed by a few large outliers. In one example, segments are defined by values for a set of pre-defined variables, or "segment filters" that help explain an abnormality and/or suggest possible solutions. To illustrate, in one example, the present disclosure may monitor a failure rate (e.g., a KPI) of residential gateways serving customer premises for Internet, voice, and/or television (TV) services. Possible segment filters include: equipment model, configuration, material, material source, manufacturing vendor, manufacturing plant location, installation type, and installation technician. In one example, the present disclosure may then find segments of equipment (and/or installations) that have higher failure rates than comparable equipment (and/or installations).

Existing anomaly detection techniques often track quantities of interest (e.g., KPIs) over time (e.g., where KPIs may be collected by vendor/equipment-specific tools or by a network monitoring system that aggregates KPI data from diverse types of equipment). However, these existing techniques may be restricted to looking for anomalies over time by comparing to each segment's own history. On the other hand, understanding how one type of network equipment segment compares with or deviates from a larger population of network equipment provides valuable insight and additional actionable information. In addition, existing network anomaly detection approaches may not allow for systematic and accurate scoping or identification of the most important segments that may be driving an abnormality in KPIs (e.g. the largest, most statistically significant, or most divergent segments). When monitoring KPIs for an entire population, one or more segments may experience abnormal KPIs, while the overall population KPIs do not trigger an alert. On the other hand, the overall population may exhibit abnormal KPIs, but it may be unknown whether this result represents an experience shared across the population, or if it is driven by certain segments. To find out, one could perform ad-hoc and resource-consuming analyses, such as exploratory univariate plots or manual inspection of a vast array of possible candidate segments. Without a systematic and thorough search, these analyses may likely result in errors, such as failure to discover the strongest contributing segments or unstable results. On the other hand, tracking all segments of possible interest (e.g., with a large number of segmenting filters, each with a large number of possible values or bins of values) may result in an unmanageably large number of segments. This can be overwhelming for human analysts and raises the risk of false positives. Moreover, many of these segments may potentially have very few data points. Accordingly, the KPI values of these segments may not offer valid and strong conclusions about how abnormal they are, compromising the accuracy of any anomaly detected. For example, a segment comprising only three network equipment items out of which one may have a high equipment failure KPI of 33% and thus be abnormal. However, a network operator may hesitate to trust this conclusion based on so few data points. Similarly, the communication network may be so large that the network operator and/or automated systems managing the network may only be interested (at least initially) in larger segments with a substantial number of network infrastructure items.

As noted above, examples of the present disclosure may find segments, or groups of entities (e.g., network infrastructure items) with abnormal KPIs, not just when compared to a respective segment's own history but alternatively when compared to other segments in any defined population of these entities. Notably, if segments were created naively by using all combinations of segmenting filters, an overwhelming number of segments may be obtained, and many segments may have too few data points to offer valid conclusions. As also mentioned above, the present disclosure may apply frequent itemset mining and association rule mining to intelligently and optimally combine small segments, or groups of network infrastructure items to form robust segments that are large enough for statistically robust conclusions without diluting anomaly signals. In one example, anomalies are detected from the robust segments that are constructed. In addition, in one example, after obtaining the top abnormal segments, similar segments may also be intelligently grouped/aggregated for more interpretable and focused anomaly alerting.

In one example, the present disclosure may comprise three stages. For example, the present disclosure may first construct segments, e.g., robust segments. In one example, the present disclosure may apply a sparsity threshold, which represents the minimum size for robust segments, e.g., 30 network infrastructure items or 5% of all qualified network infrastructure items. In accordance with the present disclosure, in one example the minimum on each segment should not be substantially lower than 30 for sound statistical inferences. If a particular segment has a size that exceeds the sparsity threshold, then the particular segment may be used as-is. If not, small (e.g., "non-robust") segments may be combined until there is just enough data. In one example, segments may be combined by removing one or more segment filters. This effectively combines all segments with different values on the removed filters. For example, a combined segment may be created of: "customer_tenure=ANY, equipment_age=<1year, product=internet_only." This may result in a combination of original segments with different values for customer_tenure (but the same, specified values for equipment_age and product) are combined. This is equivalent to removing customer_tenure as a segmenting filter.

In one example, combining segments may also be accomplished by splitting a segment filter into two or more filters containing disjoint but contiguous sets of values or nested sets of values. Thus, a subset of values from a filter may be used to effect a combination of original segments into a merged segment without having to combine all values. For example, a customer_tenure filter can be split into 3 nested boolean filters: customer_tenure_<1yr, customer_tenure_<2yr, customer_tenure_<3yr, and create a combined segment of "customer_tenure_<1yr=ANY, customer_tenure_<2yr=ANY, customer_tenure_<3yr=True, equipment_age=<1year, product=internet_only." Here all original segments with customer tenure <3 years (but not for >=3 years) are combined (while equipment_age and product stay as specified). In either case, the task of combining segments may be defined as removing original segment filters or splitting segment filters. In addition, in one example, a frequent itemset mining process may be applied to efficiently compute how many and which segment filters to remove in order to combine a non-robust segment with one or more other segments (either non-robust or already robust) to meet the sparsity threshold. Frequent itemset mining was developed in the context of discovering regular patterns in grocery products frequently bought together in supermarkets, e.g., onions, potatoes, and hamburger meat, or beer, milk, and diapers. In the present disclosure, frequent itemset mining is adapted and extended to discovering combinations of segment filters that provide segments meeting the minimum sparsity threshold (e.g., robust segments).

In particular, in one example, the present disclosure may first create a frequent pattern (FP) tree using a FP-growth algorithm to find all segments that exceed the sparsity threshold. In other words, all robust segments are found. In a second pass, robust segments having constituent segments that are already large enough are filtered out. The result is segments (which may include original segments and composited segments) just large enough to exceed the sparsity threshold, which may be called minimally robust segments. It should be noted that all of these remaining segments are still robust segments, since all exceed the sparsity threshold. It should also be noted that this approach is globally optimal, and faster than a naive exhaustive search.

In one example, in a second stage, the present disclosure may then monitor the robust segments to detecting abnormalities, or anomalies. Advantageously, the present disclosure can detect an abnormal segment out of a defined population of segments. For instance, a segment population can first be defined as all robust segments meeting one or more specified requirements (e.g., all residential gateways within the state of California installed between 2010 and 2015), and how abnormal each segment is relative to the rest of this defined population can be computed. For example, to find robust segments of customer equipment having KPIs that are higher than those of the same equipment model, a comparison population may be created by first filtering to all robust segments having the same value for the filter of "equipment model" then comparing KPIs of each robust segment to an overall or aggregate KPI for the entire defined population (e.g., a mean, median, average, etc.). The same or a similar filtering and analysis may be repeated for each equipment model of interest.

It should be noted that the present disclosure may still detect anomalies in any robust segment in relation to the segment's own history. However, compared to prior anomaly detection methods, the present disclosure provides more confidence that a detected anomaly is statistically robust and that any conclusion drawn is not biased by small sample size. It should also be noted that a variety of anomaly detection algorithms can be used in both of the above settings. For instance, in one example, a measure of anomalousness/abnormality (e.g., an anomaly metric) may be defined based upon a distance (e.g., a difference) of the KPI for a given segment from the median of the KPI for the defined population divided by median absolute deviation (MAD). In one example, the use of this particular metric may help to prevent a few large outliers from swaying the results. Thus, the anomaly metric provides a quantitative measure of how abnormal each segment is compared to the defined population (e.g., a comparison population) or the segment's own history. In addition, in one example, the present disclosure may rank the robust segments in a defined population ordered by the respective anomaly metrics to provide actionable information in managing and reconfiguring the communication network.

In one example, the present disclosure may output the most abnormal segments for a particular inquiry (either against peers or segments' own histories), e.g., the top 10 percent, top 15 percent, etc., or the top 30 segments, the top 40 segments, etc. However, in one example, the present disclosure may further identify aggregations of these top abnormal segments (or "aggregated segments"), which may comprise a grouping or merging of segments that are quantitatively similar. For instance, segments that share the same values in a large number of segment filters (or stated differently, segments that differ by a small number of segment filters, such as one or two segment filters) may be aggregated. Each such aggregated segment may provide an indication of a shared underlying driving force. In other words, the separate abnormal/anomalous KPIs may be manifestations of a same network anomaly, rather than multiple separate events with different underlying causes. Thus, the reporting of an anomaly with regard to an aggregated segment may better direct a network response.

In one example, frequent itemset mining (or association rule mining) may further be applied to evaluate and potentially organize top abnormal segments into one or more aggregated segments. In one example, the "top abnormal segments" may be selected as the "N" most anomalous segments based upon the anomaly metric of the KPI of interest, e.g., the top 20 segments, the top 50 segments, the top 100 segments, etc. In this case, the frequent itemset mining procedure may be applied on the top abnormal segments only. In one example, a minimum threshold (e.g., between two and a third of the length of a top anomaly list) may be selected, and a frequent itemset mining procedure may be applied, similar to as discussed above. In one example, all appropriate aggregations of top abnormal segments that just exceed this minimum threshold may be applied. For instance, aggregation may be accomplished by setting some segment filters to take on a value of "any" or to have a defined set/range of values. The top abnormal segments may then be re-ranked, with any aggregated segments falling within appropriate positions in the list. In one example, the threshold for merging segments at this stage may be to allow aggregating of segments up to the point where the anomaly metric for such an aggregated group does remain no less than two standard deviations from a reference anomaly metric (e.g., a reference average for such an aggregated segment compared to its own history or a reference average with respect to the other segments in the comparison population).

Thus, examples of the present disclosure provide several improvements, including detection of segments having KPIs that are abnormal when compared to any defined equipment population. Populations are easily definable, and may be tested to identify and report a measure of degree of abnormality for each constituent segment of the population with respect to a KPI (or multiple KPIs via multiple separate inquiries). At the same time, the present disclosure also enables monitoring of segments over time for anomalies relative to the segments' own histories. Examples of the present disclosure systematically and thoroughly search for the most significant segments driving an anomaly, or anomalies, which may escape notice at higher aggregations and which may be hard to manually trace. The present disclosure also aggregates quantitatively similar top abnormal segments for additional actionable insight. The present disclosure provides more robust results and guards against biased or invalid anomaly conclusions resulting from small segments or large outliers. In particular, the present disclosure provides an intelligent way to consolidate many small, invalid segments into a manageable number of robust segments. The present disclosure also provides a solution that is customizable, and that produces interpretable and ranked results for clear, actionable, and prioritized network monitoring and automated configuration/reconfiguration. These and other aspects of the present disclosure are described in greater detail below in connection with the examples of FIGS. 1-3.

Figure 1:
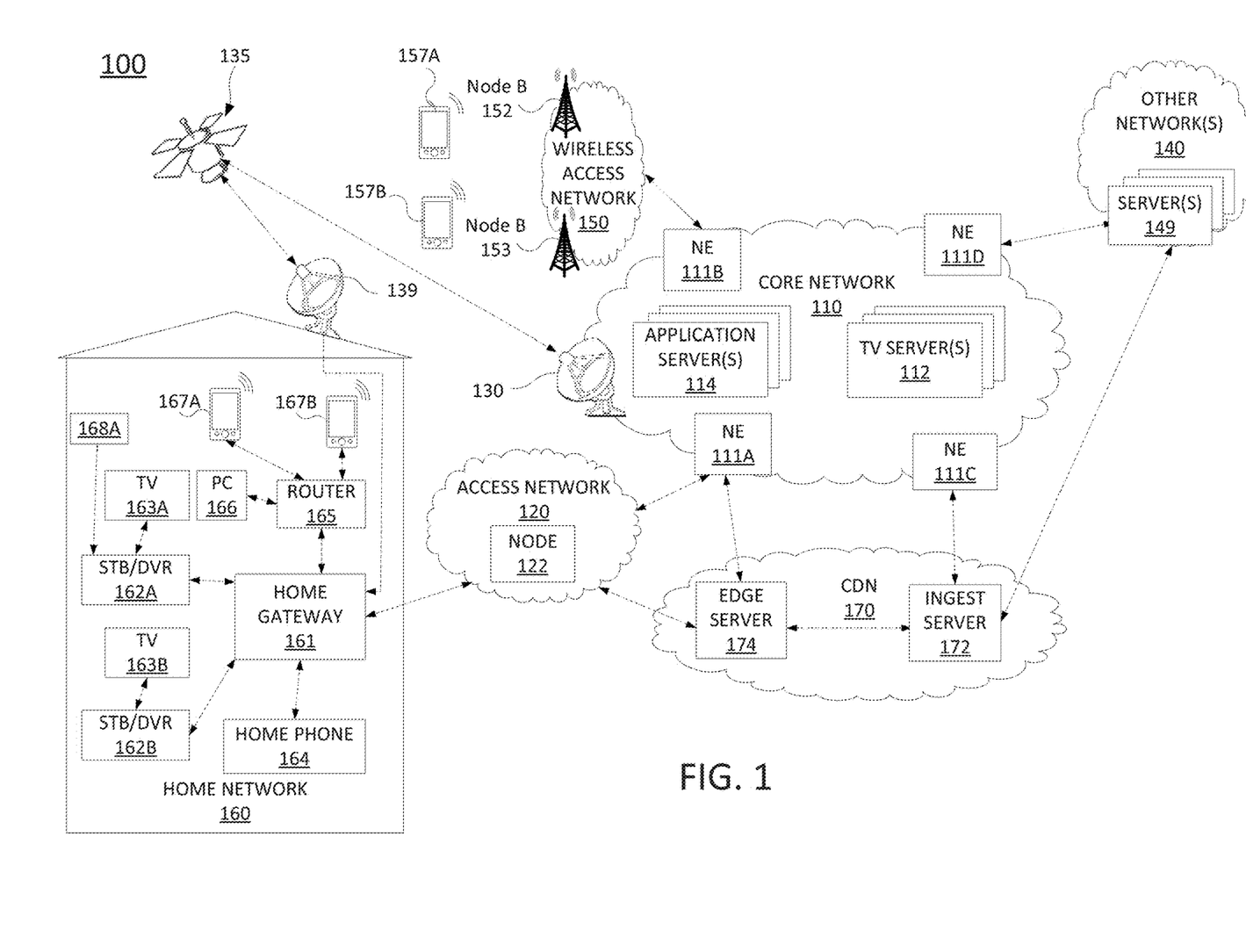
FIG. 1 illustrates an example network related to the present disclosure.

To better understand the present disclosure, FIG. 1 illustrates an example network 100, related to the present examples. As shown in FIG. 1, the network 100 connects mobile devices 157A, 157B, 167A and 167B, and home network devices such as home gateway 161, set-top boxes (STBs) 162A and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140, content distribution network (CDN) 170, and/or the Internet in general. For instance, connections between core network 110, access network 120, home network 160, CDN 170, wireless access network 150 and other networks 140 may comprise the Internet in general, internal links under the control of single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by a same entity as core network 110.

In one example, each of the mobile devices 157A, 157B, 167A, and 167B may comprise any subscriber/customer endpoint device (or "user endpoint device") configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, wireless access network 150, access network 120, and so forth. As shown in FIG. 1, core network 110 may also include a plurality of television (TV) servers 112, and a plurality of application servers 114. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may include content server(s) to store scheduled television broadcast content for a number of television channels, video-on-demand (VoD) programming, local programming content, and so forth. Alternatively, or in addition, content providers may stream various contents to the core network 110 for distribution to various subscribers, e.g., for live content, such as news programming, sporting events, and the like. Television servers 112 may also include advertising server(s) to store a number of advertisements that can be selected for presentation to viewers, e.g., in the home network 160 and at other downstream viewing locations. For example, advertisers may upload various advertising content to the core network 110 to be distributed to various viewers. Television servers 112 may also include interactive TV/video-on-demand (VoD) server(s) and/or network-based digital video recorder (DVR) servers, as described in greater detail below.

In one example, the access network 120 may comprise a fiber access network, a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between home network 160 and core network 110 relating to voice telephone calls, communications with web servers via other networks 140, content distribution network (CDN) 170 and/or the Internet in general, and so forth. In another example, access network 120 may be operated by a different entity from core network 110, e.g., an Internet service provider (ISP) network.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

As illustrated in FIG. 1, core network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. It should be noted that the foregoing are only several examples of the types of relevant application servers 114 that may be included in core network 110 for storing information relevant to providing various services to users.

Figure 2:
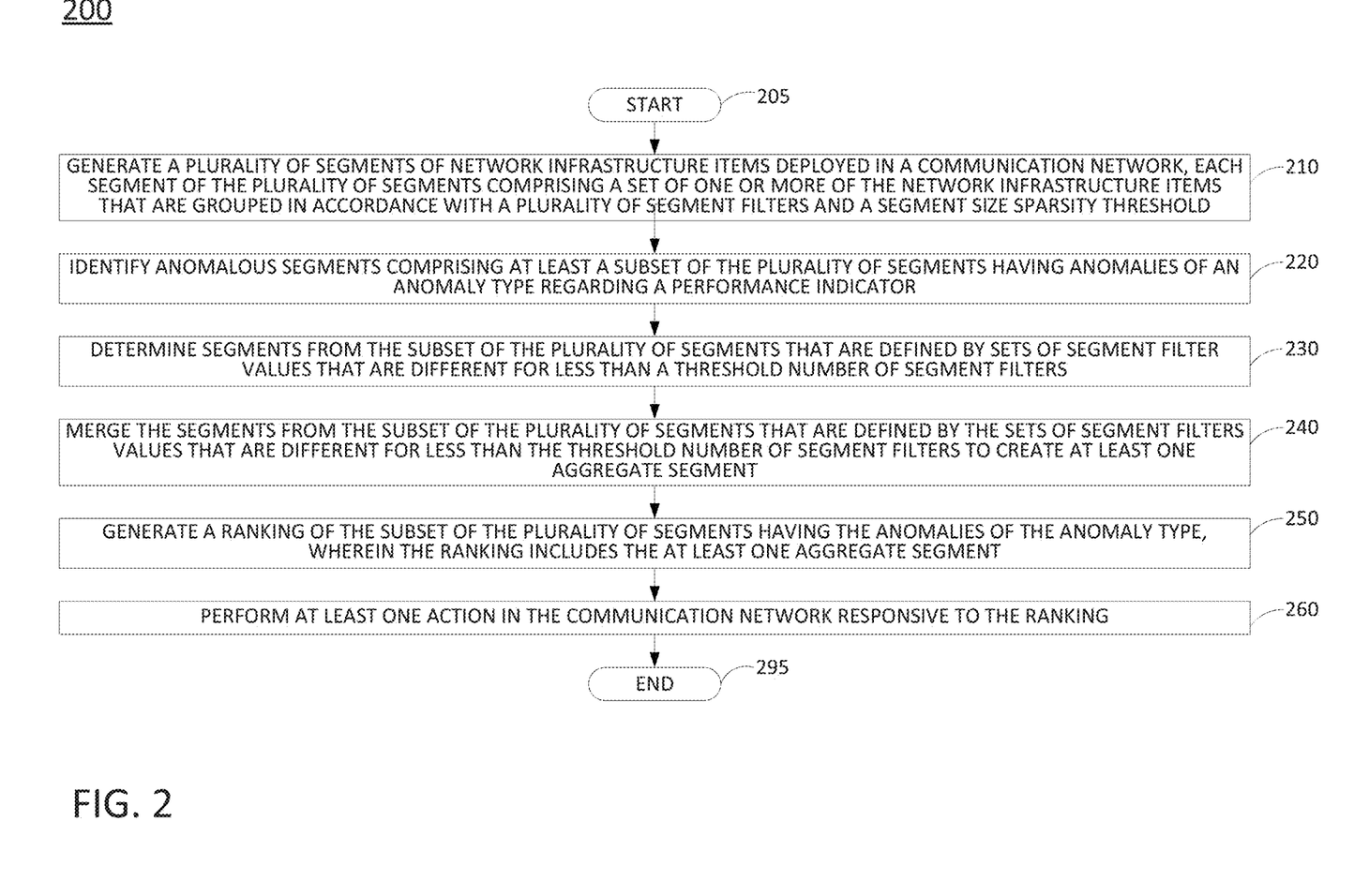
FIG. 2 illustrates a flowchart of an example method for detecting network anomalies for robust segments of network infrastructure items in accordance with segment filters associated via frequent itemset mining.

Application servers 114 may also represent a processing system for detecting network anomalies for robust segments of network infrastructure items in accordance with segment filters associated via frequent itemset mining, in accordance with the present disclosure. For instance, one or more of application servers 114 may each comprise a computing device or processing system, such as computing system 300 depicted in FIG. 3, and may be configured to perform one or more steps, functions, or operations for detecting network anomalies for robust segments of network infrastructure items in accordance with segment filters associated via frequent itemset mining. For instance, an example method for detecting network anomalies for robust segments of network infrastructure items in accordance with segment filters associated via frequent itemset mining is illustrated in FIG. 2 and described below.

Figure 3:
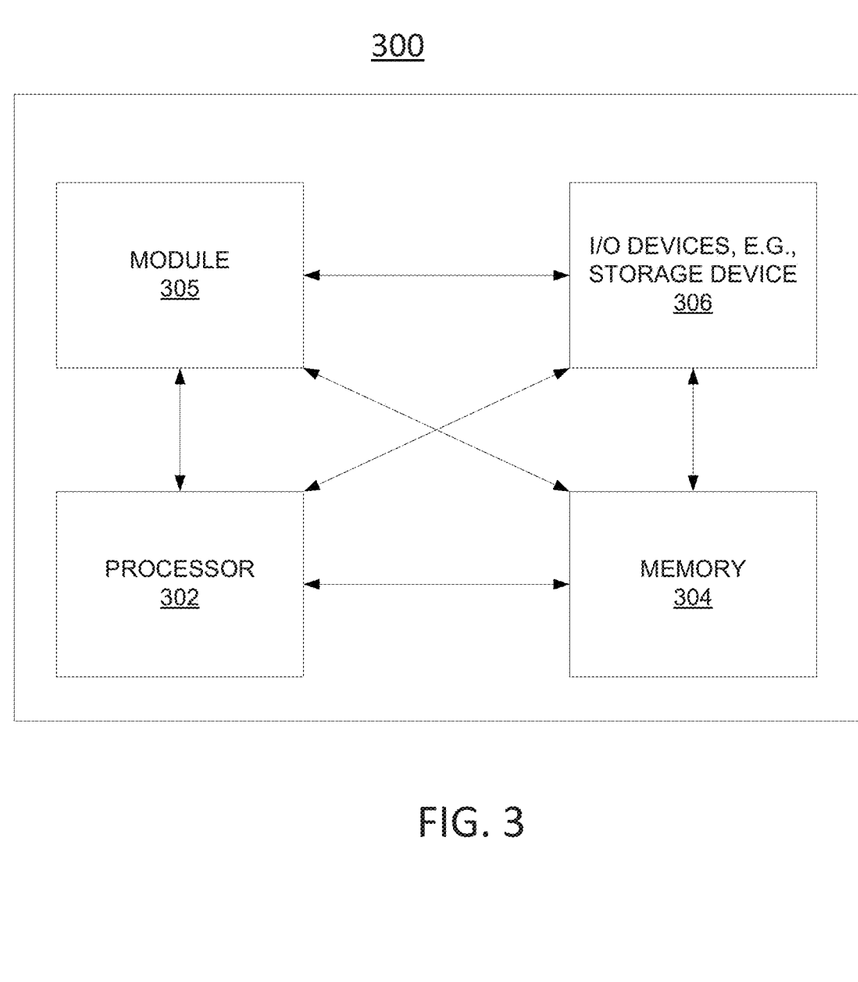
FIG. 3 illustrates a high level block diagram of a computing device or system specifically programmed to perform the steps, functions, blocks and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 3 and discussed below) or multiple computing devices collectively configured to perform various steps, functions, and/or operations in accordance with the present disclosure.

In accordance with the present disclosure, other networks 140 and servers 149 may comprise networks and devices of various content providers of webpages, documents, videos, or other content items. In one example, servers 149 may represent "origin servers" which may originate content that may be stored in and distributed via content distribution network (CDN) 170. In this regard, the content from servers 149 that may be stored in and distributed via content distribution network (CDN) 170 may include webpages, documents, audio programs, video programs, e.g., movies, television shows, video news programs, sports video content, and so forth, as well as video advertisements.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions comprise a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections. Although STB/DVR 162A and STB/DVR 162B are illustrated and described as integrated devices with both STB and DVR functions, in other, further, and different examples, STB/DVR 162A and/or STB/DVR 162B may comprise separate STB and DVR devices.

Network 100 may also include a content distribution network (CDN) 170. In one example, CDN 170 may be operated by a different entity from the core network 110. In another example, CDN 170 may be operated by a same entity as the core network 110, e.g., a telecommunication service provider. In one example, the CDN 170 may comprise a collection of cache servers distributed across a large geographical area and organized in a tier structure. The first tier may comprise a group of servers that accesses content web servers (e.g., origin servers) to pull content into the CDN 170, referred to as an ingestion servers, e.g., ingest server 172. The content may include videos, content of various webpages, electronic documents, video games, etc. A last tier may comprise cache servers which deliver content to end users, referred to as edge caches, or edge servers, e.g., edge server 174. For ease of illustration, a single ingest server 172 and a single edge server 174 are shown in FIG. 1. In between the ingest server 172 and edge server 174, there may be several layers of servers (omitted from the illustrations), referred to as the middle tier. In one example, the edge server 174 may be multi-tenant, serving multiple content providers, such as core network 110, content providers associated with server(s) 149 in other network(s) 140, and so forth.

As mentioned above, TV servers 112 in core network 110 may also include one or more interactive TV/video-on-demand (VoD) servers and/or network-based DVR servers. Among other things, an interactive TV/VoD server and/or network-based DVR server may function as a server for STB/DVR 162A and/or STB/DVR 162B, one or more of mobile devices 157A, 157B, 167A and 167B, and/or PC 166 operating as a client video player. For example, STB/DVR 162A may present a user interface and receive one or more inputs (e.g., via remote control 168A) for a selection of a video. STB/DVR 162A may request the video from an interactive TV/VoD server and/or network-based DVR server, which may retrieve a manifest file for the video from one or more of application servers 114 and provide the manifest file to STB/DVR 162A. STB/DVR 162A may then obtain one or more portions of the video from one or more network-based servers, such as one of the TV servers 112, edge server 174 in CDN 170, and so forth, as directed via the manifest file. For instance, URL(s) and other information that may be used by a player device to request and obtain chunks of adaptive or non-adaptive bitrate video may be stored in the manifest file which may be obtained by the player device in advance of a streaming session.

To illustrate, the manifest file may direct the STB/DVR 162A to obtain the video from edge server 174 in CDN 170. The edge server 174 may already store the video (or at least a portion thereof) and may deliver the video upon a request from the STB/DVR 162A. However, if the edge server 174 does not already store the video, upon request from the STB/DVR 162A, the edge server 174 may in turn request the video from an origin server. The origin server which stores the video may comprise, for example, one of the servers 149 or one of the TV servers 112. The video may be obtained from an origin server via ingest server 172 before passing the video to the edge server 174. In one example, the ingest server 172 may also pass the video to other middle tier servers and/or other edge servers (not shown) of CDN 170. The edge server 174 may then deliver the video to the STB/DVR 162A and may store the video until the video is removed or overwritten from the edge server 174 according to any number of criteria, such as a least recently used (LRU) algorithm for determining which content to keep in the edge server 174 and which content to delete and/or overwrite. It should be noted that a similar process may involve other devices, such as TV 163A or TV 163B (e.g., "smart" TVs), mobile devices 167A, 167B, 157A or 157B obtaining a manifest file for a video from one of the TV servers 112, from one of the servers 149, etc., and requesting and obtaining videos (e.g., the video chunks thereof) from edge server 174 of CDN 170 in accordance with corresponding URLs in the manifest file.

As mentioned above, one or more of application servers 114 may represent a processing system for detecting network anomalies for robust segments of network infrastructure items in accordance with segment filters associated via frequent itemset mining. To illustrate, application server(s) 114 may maintain or obtain a database of various network infrastructure items of one or more portions of the network 100, e.g., core network 110, wireless access network 150, access network 120, home network 160, CDN 170, etc. The network infrastructure items may comprise, for example: routers, gateways, optical networking terminals (ONTs), firewalls, MFN (mini-fiber nodes), fiber-optic cables, optical switches, databases, line cards, antennas, baseband units, cable headends, video on demand (VoD) servers, batteries, generators, and so forth. For instance, as illustrated in FIG. 1, network infrastructure items may comprise network elements 111A-111D, TV server(s) 112, node 122, elements 152 and 153 (e.g., a NodeB, eNodeB, gNodeB, etc.), home gateway 161, router 165, ground station 130, satellite 135, and so forth.

In accordance with the present disclosure, application server(s) 114 may then generate robust segments of network infrastructure items as described herein, e.g., each segment comprising a set of one or more of the network infrastructure items that are grouped in accordance with a plurality of segment filters and a segment size sparsity threshold. For instance, application server(s) 114 may first create a frequent pattern (FP) tree using a FP-growth algorithm to find all segments that exceed the sparsity threshold and then filtering out robust segments having constituent segments that are already large enough to exceed the sparsity threshold.

In addition, application server(s) 114 may identify anomalous segments comprising at least a subset of the plurality of segments having anomalies of an anomaly type regarding a performance indicator. In one example, the anomaly type may be associated with one or more KPIs, such as packet loss rate, device temperature, link failure rate, frequency of rebooting events, outbound packet rates, average processor utilization, average memory utilization, peak processor utilization in a time period, peak memory utilization in a time period, average number of simultaneous connections, and so on. For instance, an anomaly type may be an excess of network infrastructure items having packet loss rates exceeding a threshold within at least one time period (e.g., a number or percentage exceeding the threshold, which itself could be a number or percentile within the population), an excess of network infrastructure items having temperatures exceeding a threshold within at least one time period, an excess of network infrastructure items having link failure rates exceeding a threshold within at least one time period (e.g., radio link failures), an excess of network infrastructure items having rebooting events exceeding a threshold within at least one time period, and so forth.

In one example, the present disclosure may track KPIs for various network infrastructure items and may calculate an anomaly metric for each segment: e.g., a measure of anomalousness/abnormality. For instance, the anomaly metric may be defined based upon a distance of the KPI for a given segment (e.g., an average or peak measure of the KPI among network infrastructure devices of the segment) from the median of the KPI for a defined population divided by median absolute deviation (MAD). In one example, the defined population, or comparison population may be defined by network operations personnel or one or more other automated systems within the network 100 for ad-hoc insights or for tracking on an ongoing basis. Thus, the anomaly metric provides a quantitative measure of how abnormal each segment is compared to the defined population (e.g., a comparison population). Alternatively, or in addition, the anomaly metric may be defined similarly in comparison to each segment's own history.

In one example, application server(s) 114 may identify the "anomalous segments" as those segments having the top 'NI" anomaly metrics with respect to the anomaly type of interest, a top "X" percent of segments ranked by anomaly metrics, those segments having anomaly metrics exceeding a threshold value of the anomaly metric, etc. In addition, application server(s) 114 may merge anomalous segments that are defined by the sets of segment filters values that are different for less than the threshold number of segment filters to create at least one aggregate segment. In other words, similar anomalous segments may be combined into aggregate segments for additional actionable insight. For instance, application server(s) 114 may re-rank the anomalous segments to account for the aggregated segments.

In addition to the foregoing, application server(s) 114 may also perform at least one action in the network 100 responsive to the ranking. For instance, application server(s) 114 may provide the ranking to at least one recipient computing system. The application server(s) 114 may provide such information in the form of a notification or a report, which may include a table, a spreadsheet, a chart, a map, which may indicate a geographic distribution of network infrastructure devices, and so on. The at least one recipient computing system may comprise an endpoint device of a network operations personnel, or may comprise one or more additional automated computing systems. In one example, the report may be an interactive report which may permit network operations personnel to select particular segments in the report and visualize aspects relating to the segments (e.g., geographic locations of network infrastructure devices of the selected segment(s) on a map, one or more charts with more detailed information regarding the network infrastructure devices of the selected segment(s), and so forth).

In one example, application server(s) 114 may also represent a self-optimizing network (SON)/software defined network (SDN) controller that may function as a self-optimizing network (SON) orchestrator that is responsible for activating and deactivating, allocating and deallocating, and otherwise managing a variety of network components. For instance, application server(s) 114 may activate and deactivate antennas/remote radio heads of wireless access network 150, may steer antennas/remote radio heads of wireless access network 150 (e.g., adjusting vertical tilt angles, azimuth bearings, beamwidths, power levels, and or other settings), may allocate or deallocate (or activate or deactivate) baseband units in a BBU pool, may add (or remove) one or more network slices, and may perform other operations for adjusting configurations of components of wireless access network 150 in accordance with the present disclosure.

In one example, application server(s) 114 may represent an SDN controller that is responsible for instantiating, configuring, managing, and releasing VNFs to perform the functions of routers, switches, and other devices, provisioning routing tables and other operating parameters for the VNFs, and so forth. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes. Accordingly, application server(s) 114 representing an SDN controller may be connected directly or indirectly to any one or more network elements of core network 110, and of the network 100 in general.

Accordingly, in one example, the at least one action in the network responsive to the ranking may comprise, reconfiguring the communication network in response to the ranking of the subset of the plurality of segments, such as throttling network traffic associated with the network infrastructure items of one or more of the anomalous segments or rerouting the network traffic associated with the network infrastructure items of the one or more anomalous segments, allocating at least one additional resource of the communication network or removing at least one existing resource of the communication network, such as instantiating at least one virtual network function (VNF) to process network traffic associated with the network infrastructure items of the one or more anomalous segments, and so forth.

Thus, in one example, the at least one action in the network responsive to the ranking may comprise application server(s) 114 allocating at least one additional resource of the communication network or removing at least one existing resource of the communication network, such as providing an additional content server or removing an existing content server, adding an additional network firewall or removing an additional network firewall, and so on. Alternatively, or in addition, application server(s) 114 may reroute at least a portion of traffic in a selected portion of the network. For instance, the ranking may indicate a problem with certain firewalls of a particular type, in a particular region, having certain physical connection configurations, etc., such that if a new firewall is added or an existing firewall is removed, application server(s) 114 may update routing tables or other traffic flow mechanisms to send network traffic to such a new firewall, or to redirect network traffic from a firewall that is being deactivated/removed to a different firewall, and so on.

Similarly, in one example, the rerouting of network traffic may comprise load-balancing at least a portion of network traffic in one or more portions of the network 100. For instance, a problem in a particular type of router that causes such routers to operate at less than full operational capacity may be evidenced by a segment comprising such routers being at the top or near the top of the ranking. As such, application server(s) 114 may redirect more traffic via other types of routers that are not suffering from such a problem. Where the ranking is indicative of a problem in a segment of content servers (e.g., TV servers 112, CDN edge servers, such as edge server 174, etc.), some content servers may be decommissioned and/or new content servers instantiated. In addition, some users (e.g., their respective endpoint devices, set-top boxes, etc.) may be equally served by two content servers, whereas endpoint devices of other users may be in locations or have equipment that otherwise can only be served by one of the content servers. Accordingly, application server(s) 114 may reserve capacity of one of the content servers (e.g., via instructions to such content servers and/or via instructions to endpoint devices seeking the content) for those users who cannot be directed elsewhere, while directing other users/endpoint devices to the alternate content server. In one example, the rerouting of network traffic may include offloading at least a portion of traffic in a selected portion of the network, e.g., based upon anticipated/predicted demand with regard to one or more segments in the ranking, application server(s) 114 may offload a portion of traffic in the selected portion(s) of the network before it is overloaded. In still another example, application server(s) 114 may throttle network traffic (e.g., slowing the flow of network traffic) in at least a portion of the network and/or for inbound flows to network infrastructure items of one or more anomalous segments. For instance, the anomalous segments may include one or more segments of firewalls that may have performance problems and cannot operate at a normal/expected throughput. Thus, one or more upstream components, such as routers, switches, etc. may be configured to slow the flow of traffic to such firewalls.

Further details regarding the functions that may be implemented by application servers 114 are discussed in greater detail below in connection with the example of FIG. 2. In addition, it should be noted that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

FIG. 2 illustrates a flowchart of a method 200 for detecting network anomalies for robust segments of network infrastructure items in accordance with segment filters associated via frequent itemset mining, in accordance with the present disclosure. In one example, the method 200 is performed by one or more of application server(s) 114 of FIG. 1, or any one or more components thereof, such as a processing system, or by one of these devices in conjunction with other devices and/or components of network 100 of FIG. 1. In one example, the steps, functions, or operations of method 200 may be performed by a computing device or system 300, and/or a processing system 302 as described in connection with FIG. 3 below. For instance, the computing device or system 300 may represent any one or more components of the network 100 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system, and each instance may represent one of the application servers 114 and/or edge server 174, ingest server 172, TV servers 112, and so forth in FIG. 1. For illustrative purposes, the method 200 is described in greater detail below in connection with an example performed by a processing system, such as processing system 302. The method 200 begins in step 205 and proceeds to step 210.

At step 210, the processing system generates a plurality of segments of network infrastructure items deployed in a communication network, each segment of the plurality of segments comprising a set of one or more of the network infrastructure items that are grouped in accordance with a plurality of segment filters and a segment size sparsity threshold. For instance, step 210 may comprise grouping the network infrastructure items into a plurality of groups in accordance with the plurality of segment filters, identifying a plurality of non-robust groups within the plurality of groups that contain a number of the network infrastructure items below the segment size sparsity threshold, and creating at least one merged group in response to identifying the plurality of non-robust groups. For instance, the at least one merged group may comprise (1) at least a first non-robust group of the plurality of non-robust groups and (2) at least a second group comprising at least a second non-robust group of the plurality of non-robust groups, or at least one other group of the plurality of groups. In one example, generating the at least one merged group may comprise removing one or more of the plurality of segment filters associated with one or more of the at least the first non-robust group or the at least the second group. Alternatively, or in addition, the generating of the at least one merged group may comprise splitting at least one of the plurality of segment filters associated with one or more of the at least the first non-robust group or the at least the second group into at least two or more segment filters. In one example, the removing or splitting of filter(s) may be with respect to only an original non-robust group, or groups. The filter(s) may remain in place for other groups that already meet the segment size sparsity threshold. In one example, the at least the first non-robust group and the at least the second group are no longer part of the plurality of groups after the merging (e.g., these are replaced by the merged group). Thus, the plurality of segments generated at step 210 may comprise the plurality of groups, or the plurality of groups including the at least one merged group.

In one example, the grouping of the network infrastructure items into the plurality of groups, the identifying of the plurality of non-robust groups, and the generating of the at least one merged group may be in accordance with a frequent pattern (FP) growth algorithm to discover combinations of segment filters or segment filter values that result in the at least one merged group that meets the segment size sparsity threshold. In one example, the segment size sparsity threshold is defined based upon a statistical robustness associated with an overall quantity of the network infrastructure items. For example, the segment size sparsity threshold may be at least 30 or more network infrastructure items per segment (or per "group"). Alternatively, or in addition, the segment size sparsity threshold may be at least 5 percent of the overall quantity of the network infrastructure items, at least 10 percent of the overall quantity of the network infrastructure items, etc. (e.g., where the overall quantity may be with respect to all network infrastructure items for which KPIs are tracked, all network infrastructure items in a portion of the network covered by the processing system (e.g., where one or more other processing systems are assigned to cover other portions of the network), all network infrastructure items otherwise defined by a network operator to be tracked in accordance with a particular task or set of tasks, and so forth). For instance, in one example, only cellular radio access network infrastructure items may be designated for tracking and alerting (e.g., for a one time/ad hoc inquiry, for tracking over a defined time period, such as one week, two weeks, etc., for monitoring by the particular processing system versus other processing systems that may be assigned to perform similar operations), and so on.

At step 220, the processing system identifies anomalous segments (if any) comprising at least a subset of the plurality of segments having anomalies of an anomaly type regarding a performance indicator. For instance, step 220 may comprise determining, for each of the anomalous segments, that the network infrastructure items of the anomalous segment exhibit a statistical deviation regarding the performance indicator. For example, for a particular segment, the statistical deviation may comprise a deviation of first measures of the performance indicator for the anomalous segment for at least one time period compared to second measures of the performance indicator for the anomalous segment for one or more historical time periods preceding the at least one time period. In another example, the statistical deviation may comprise a deviation of first measures of the performance indicator for the anomalous segment for at least one time period compared to second measures of the performance indicator for other segments of the plurality of segments for the at least one time period. In both examples, the at least one time period can be a current time period, or other time period(s). In one example, the statistical deviation may comprise a measure of anomalousness/abnormality (e.g., an anomaly metric) defined based upon a distance (e.g., a difference) of the KPI for a given segment from the median of the KPI for the defined population divided by median absolute deviation (MAD).

In one example, for each of the anomalous segments, the anomaly type regarding the performance indicator may comprise an excess of network infrastructure items having packet loss rates exceeding a threshold within at least one time period, an excess of network infrastructure items having temperatures exceeding a threshold within at least one time period, an excess of network infrastructure items having link failure rates exceeding a threshold within at least one time period (e.g., radio link failure), an excess of network infrastructure items having rebooting events exceeding a threshold within at least one time period, an excess of network infrastructure items having outbound packet rates exceeding a threshold within at least one time period (for instance, a widespread router vulnerability may affect a particular router type that results in a botnet, a denial of service attack, etc.), and so forth. In one example, step 220 may include identifying the most anomalous segments for a particular inquiry (either against peers' anomaly metrics or against the segments' own histories), e.g., the top 10 percent, top 15 percent, etc., or the top 30 segments, the top 40 segments, etc. In other words, the "anomalous segments" identified at step 220 may comprise those segments from a top of a list organized by the anomaly metric that exceed a defined threshold/cutoff with regard to a position in the list, with regard to the anomaly metric of a segment versus a threshold/cutoff value for the anomaly metric, etc.

At step 230, the processing system determines segments from the subset of the plurality of segments that are defined by sets of segment filter values that are different for less than a threshold number of segment filters (or stated differently, segments that are sufficiently quantitatively similar, e.g., sharing more than a threshold number or percentage of segment filter values or ranges of values).

At step 240, the processing system merges the segments from the subset of the plurality of segments that are defined by the sets of segment filters values that are different for less than the threshold number of segment filters to create at least one aggregate segment. In other words, the plurality of segments (e.g., the set of top anomalous segments) is modified to include the at least one aggregate segment. In one example, the constituent anomalous segments from which the at least one aggregate segment is formed are removed from the subset of the plurality of segments, or cease to exist independently once combined into the aggregate segment.

At step 250, the processing system generates a ranking of the subset of the plurality of segments having the anomalies of the anomaly type, wherein the ranking includes the at least one aggregate segment. For instance, as noted above, the present disclosure may identify aggregations of these top abnormal segments (or "aggregated segments"), which may comprise a grouping or merging of segments that are quantitatively similar. Accordingly, this may be accomplished by the processing system via steps 230-250 of the method 200. Each such aggregated segment may be indicative of a shared underlying driving force. In other words, the separate abnormal/anomalous KPIs may be manifestations of a same network anomaly, rather than multiple separate events with different underlying causes. In addition, the ranking including such aggregated segments may highlight the potential of the same network anomaly being a shared event or which may affect network infrastructure items of multiple constituent segments.

At step 260, the processing system performs at least one action in the communication network responsive to the ranking. For instance, the at least one action may comprise providing, to at least one recipient computing system, the ranking of the subset of the plurality of segments (or that no anomalous segment was found). As noted above, the ranking may be presented in the form of a notification or a report, a table, a spreadsheet, or a chart, a map, which may indicate a geographic distribution of network infrastructure items from one or more of the anomalous segments, and so on. In one example, the at least one action may alternatively or additionally include reconfiguring the communication network in response to the ranking of the subset of the plurality of segments. For instance, the processing system may throttle network traffic associated with the network infrastructure items of the anomalous segments or reroute the network traffic associated with the network infrastructure items of the anomalous segments. For instance, the processing system may cause upstream components to slow a flow of network traffic to various affected network infrastructure items of one or more of the anomalous segments in the ranking of the subset of the plurality of segments. Similarly, the rerouting of network traffic may include load-balancing at least a portion of network traffic with regard to various affected network infrastructure items of one or more of the anomalous segments in the ranking, offloading at least a portion of network traffic with regard to various affected network infrastructure items of one or more of the anomalous segments in the ranking, or the like. The processing system may accomplish the throttling and/or the rerouting of network traffic via instructions to one or more network elements, which may include the affected network infrastructure items or other network elements that may be in various communication paths in the communication network, and/or to various endpoint devices that may communicate with or via the affected network infrastructure items.

In one example, the reconfiguring of the communication network at step 260 may alternatively or additionally comprise instantiating at least one virtual network function (VNF) to process network traffic associated with the network infrastructure items of the anomalous segments. For instance, one or more VNFs may be instantiated and traffic offloaded from affected network infrastructure items to the one or more VNFs which are configured to perform the same functions as the affected network infrastructure items (such as new virtual firewalls replacing other virtual or physical firewalls, new virtual serving gateways replacing other virtual or physical serving gateways, etc.). Broadly, step 260 may include allocating at least one additional resource of the communication network responsive to the ranking or removing at least one existing resource of the communication network responsive to the ranking. In accordance with step 260, an additional resource that may be added or an existing resource that may be removed (e.g., deactivated and/or deallocated) may be a hardware component of the network, or may be provided by hardware, e.g., bandwidth on a link, line card, router, switch, or other processing nodes, a CDN storage resource, a VM and/or a VNF, etc.

In one example, following step 260, in one example, the method 200 may return to step 210, wherein step 210 and subsequent steps of the method 200 may be repeated to reformulate robust segments, track KPIs and anomaly metrics, identify top anomalous segments, merge anomalous segments, transmit notifications and/or reconfigure aspects of the communication network in response to ranking of top anomalous segments, and so forth. In another example, following step 260, the method 200 may return to step 220 for one or more additional iterations/cycles, wherein step 220 and subsequent steps of the method 200 may be repeated to continue to monitor for segments exhibiting anomalous KPIs, and so forth. Otherwise, following step 260, the method 200 may proceed to step 295 where the method 200 ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as steps 210-260, or steps 220-260, as noted above. In one example, if no anomalous segment was found in step 220, the processing system may skip to step 260 to provide, to at least one recipient computing system, the conclusion that no anomalous segment was found. In one example, the method 200 may further include obtaining an inquiry from another automated system or network personnel regarding a comparison population for identifying anomalies with regard to one or more KPIs of interest, e.g., within a defined geographic area, within a defined equipment age range, etc. Similarly, the method 200 may include obtaining the KPI(s) of interest for one or more monitoring and alerting tasks (e.g., monitoring router segments for anomalous processor utilization, memory utilization, etc.), implementing monitoring and anomaly detection for such KPIs and relevant segments of network infrastructure items, etc. In one example, the method 200 may also be adapted to different domains, such as monitoring subscriber accounts of internet, voice, and TV product packages with respect to measures of care call rates, technician dispatch rates, and churn rates as KPIs. For instance, subscriber accounts may be segmented based on filters such as tenure, equipment model, product package, geographical areas. In one example, the processing system may then find anomalous segments of subscriber accounts whose KPIs spike relative to their own history, are higher than other segments in a comparison population (e.g., using the same equipment model, in a same geographic region, etc.). Identifying these segments can enable fast and proactive strategies towards intervening before customer premises equipment affected by an underlying problem cause widespread requests for assistance. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure. The method 200 may also be expanded to include additional steps. Thus, these and other modifications are all contemplated within the scope of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the system 300. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for detecting network anomalies for robust segments of network infrastructure items in accordance with segment filters associated via frequent itemset mining, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 306 may also include antenna elements, transceivers, power units, and so forth. Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for detecting network anomalies for robust segments of network infrastructure items in accordance with segment filters associated via frequent itemset mining (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for detecting network anomalies for robust segments of network infrastructure items in accordance with segment filters associated via frequent itemset mining (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   generating, by a processing system including at least one processor, a plurality of segments of network infrastructure items deployed in a communication network, each segment of the plurality of segments comprising a set of one or more of the network infrastructure items that are grouped in accordance with a plurality of segment filters and a segment size sparsity threshold;
   identifying, by the processing system, anomalous segments comprising at least a subset of the plurality of segments having anomalies of an anomaly type regarding a performance indicator;
   determining, by the processing system, segments from the subset of the plurality of segments that are defined by sets of segment filter values that are different for less than a threshold number of segment filters;
   merging, by the processing system, the segments from the subset of the plurality of segments that are defined by the sets of segment filters values that are different for less than the threshold number of segment filters to create at least one aggregate segment;
   generating, by the processing system, a ranking of the subset of the plurality of segments having the anomalies of the anomaly type, wherein the ranking includes the at least one aggregate segment; and
   performing, by the processing system, at least one action in the communication network responsive to the ranking.

2. The method of claim 1, wherein the at least one action comprises at least one of:
   providing, to at least one recipient computing system, the ranking of the subset of the plurality of segments; or
   reconfiguring the communication network in response to the ranking of the subset of the plurality of segments.

3. The method of claim 2, wherein the reconfiguring the communication network comprises:
   throttling network traffic associated with the network infrastructure items of the anomalous segments; or
   rerouting the network traffic associated with the network infrastructure items of the anomalous segments.

4. The method of claim 2, wherein the reconfiguring the communication network comprises:
   instantiating at least one virtual network function to process network traffic associated with the network infrastructure items of the anomalous segments.

5. The method of claim 1, wherein the generating comprises:
   grouping the network infrastructure items into a plurality of groups in accordance with the plurality of segment filters;
   identifying a plurality of non-robust groups within the plurality of groups that contain a number of the network infrastructure items below the segment size sparsity threshold; and
   creating at least one merged group in response to the identifying the plurality of non-robust groups.

6. The method of claim 5, wherein the at least one merged group comprises:
   at least a first non-robust group of the plurality of non-robust groups; and
   at least a second group comprising at least a second non-robust group of the plurality of non-robust groups, or at least one other group of the plurality of groups.

7. The method of claim 6, wherein the creating the at least one merged group comprises removing one or more of the plurality of segment filters associated with one or more of the at least the first non-robust group or the at least the second group.

8. The method of claim 6, wherein the creating the at least one merged group comprises splitting at least one of the plurality of segment filters associated with one or more of the at least the first non-robust group or the at least the second group into at least two or more segment filters.

9. The method of claim 6, wherein the plurality of segments comprises the plurality of groups, or the plurality of groups including the at least one merged group.

10. The method of claim 5, wherein the grouping the network infrastructure items into the plurality of groups, the identifying the plurality of non-robust groups, and the creating the at least one merged group are in accordance with a frequent pattern growth algorithm to discover combinations of segment filters or segment filter values that result in the at least one merged group that meets the segment size sparsity threshold.

11. The method of claim 1, wherein the segment size sparsity threshold is defined based upon a statistical robustness associated with an overall quantity of the network infrastructure items.

12. The method of claim 1, wherein the segment size sparsity threshold is at least 30 or more network infrastructure items per segment.

13. The method of claim 1, wherein the segment size sparsity threshold is at least 5 percent of an overall quantity of the network infrastructure items.

14. The method of claim 1, wherein the threshold number of segment filters comprises one segment filter or two segment filters.

15. The method of claim 1, wherein the identifying the anomalous segments comprises determining, for each of the anomalous segments, that the network infrastructure items of the anomalous segment exhibit a statistical deviation regarding the performance indicator.

16. The method of claim 15, wherein the statistical deviation regarding the performance indicator is a deviation of first measures of the performance indicator for the anomalous segment for at least one time period compared to second measures of the performance indicator for the anomalous segment for one or more historical time periods preceding the at least one time period.

17. The method of claim 15, wherein the statistical deviation regarding the performance indicator is a deviation of first measures of the performance indicator for the anomalous segment for at least one time period compared to second measures of the performance indicator for other segments of the plurality of segments for the at least one time period.

18. The method of claim 1, wherein for each of the anomalous segments the anomaly type regarding the performance indicator comprises:
- an excess of network infrastructure items having packet loss rates exceeding a threshold within at least one time period;
- an excess of network infrastructure items having temperatures exceeding a threshold within at least one time period;
- an excess of network infrastructure items having link failure rates exceeding a threshold within at least one time period;
- an excess of network infrastructure items having rebooting events exceeding a threshold within at least one time period; or
- an excess of network infrastructure items having outbound packet rates exceeding a threshold within at least one time period.

19. An apparatus comprising:
  a processing system including at least one processor; and
  a computer-readable medium storing instructions which, when executed by the processing system, cause the processing system to perform operations, the operations comprising:
   generating a plurality of segments of network infrastructure items deployed in a communication network, each segment of the plurality of segments comprising a set of one or more of the network infrastructure items that are grouped in accordance with a plurality of segment filters and a segment size sparsity threshold;
   identifying anomalous segments comprising at least a subset of the plurality of segments having anomalies of an anomaly type regarding a performance indicator;
   determining segments from the subset of the plurality of segments that are defined by sets of segment filter values that are different for less than a threshold number of segment filters;
   merging the segments from the subset of the plurality of segments that are defined by the sets of segment filters values that are different for less than the threshold number of segment filters to create at least one aggregate segment;
   generating a ranking of the subset of the plurality of segments having the anomalies of the anomaly type, wherein the ranking includes the at least one aggregate segment; and
   performing at least one action in the communication network responsive to the ranking.

20. A non-transitory computer-readable medium storing instructions which, when executed by a processing system including at least one processor, cause the processing system to perform operations, the operations comprising:
   generating a plurality of segments of network infrastructure items deployed in a communication network, each segment of the plurality of segments comprising a set of one or more of the network infrastructure items that are grouped in accordance with a plurality of segment filters and a segment size sparsity threshold;
   identifying anomalous segments comprising at least a subset of the plurality of segments having anomalies of an anomaly type regarding a performance indicator;
   determining segments from the subset of the plurality of segments that are defined by sets of segment filter values that are different for less than a threshold number of segment filters;
   merging the segments from the subset of the plurality of segments that are defined by the sets of segment filters values that are different for less than the threshold number of segment filters to create at least one aggregate segment;
   generating a ranking of the subset of the plurality of segments having the anomalies of the anomaly type, wherein the ranking includes the at least one aggregate segment; and
   performing at least one action in the communication network responsive to the ranking.

* * * * *